(12) United States Patent
Adermann

(10) Patent No.: US 8,284,847 B2
(45) Date of Patent: Oct. 9, 2012

(54) DETECTING MOTION FOR A MULTIFUNCTION SENSOR DEVICE

(75) Inventor: Stan Adermann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 12/772,735

(22) Filed: May 3, 2010

(65) Prior Publication Data

US 2011/0267456 A1  Nov. 3, 2011

(51) Int. Cl.
  H04N 11/02  (2006.01)
  H04N 7/173  (2011.01)
(52) U.S. Cl. .................. 375/240.29; 725/107
(58) Field of Classification Search ........... 375/240.29; 725/107
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |

(Continued)

FOREIGN PATENT DOCUMENTS

CN  101254344 B  6/2010

(Continued)

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.

(Continued)

*Primary Examiner* — Nhon Diep
*Assistant Examiner* — Leron Beck
(74) *Attorney, Agent, or Firm* — Vierra Magen Marcus & DeNiro LLP

(57) ABSTRACT

To detect movement of a depth camera in a motion capture system, readings from an accelerometer in the depth camera are processed to provide short and long term moving averages for each of the x, y and z axes. For each axis, a difference between the short and long term averages is obtained. A sum of the differences is obtained by summing the absolute value of each difference, across all three axes. This sum of differences is then compared to a threshold to determine if movement is detected. In another approach, the short and long term averages of the accelerometer readings are converted to pitch and roll values, and the pitch and roll values are separately compared to a threshold to determine if movement is detected. A tracking algorithm can be temporarily halted while movement is detected. Readings in the vertical direction can be attenuated by a scaling factor.

16 Claims, 11 Drawing Sheets

U.S. PATENT DOCUMENTS

| | | |
|---|---|---|
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,360,602 B1 | 3/2002 | Tazartes et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,928,382 B2 | 8/2005 | Hong et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,180,500 B2 | 2/2007 | Marvit et al. |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,620,533 B2 * | 11/2009 | Bolt et al. ........................ 703/2 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |

| | | | |
|---|---|---|---|
| 8,035,624 | B2 | 10/2011 | Bell et al. |
| 8,072,470 | B2 | 12/2011 | Marks |
| 2007/0146323 | A1* | 6/2007 | Nishikata et al. ............. 345/158 |
| 2007/0259716 | A1 | 11/2007 | Mattice et al. |
| 2007/0260398 | A1 | 11/2007 | Stelpstra |
| 2008/0026838 | A1 | 1/2008 | Dunstan et al. |
| 2008/0048980 | A1 | 2/2008 | Love et al. |
| 2008/0080789 | A1 | 4/2008 | Marks et al. |
| 2008/0192007 | A1 | 8/2008 | Wilson |
| 2009/0326857 | A1* | 12/2009 | Mathews et al. ............. 702/141 |
| 2011/0022352 | A1* | 1/2011 | Fujita et al. .................. 702/160 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Luczak, "Advanced Algorithm for Measuring Tilt with MEMS Accelerometers", Recent Advances in Mechatronics, Part 4—Nanotechnology, Design Manufacturing and Testing of MEMS, Sep. 2007, pp. 511-515, Springer Berlin Heidelberg.

Fisher, C.J., "Using an Accelerometer for Inclination Sensing," Application Note AN-1057, Analog Devices, Norwood, Mass., Feb. 2010.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

* cited by examiner

DETECTING MOTION FOR A MULTIFUNCTION SENSOR DEVICE

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Motion capture systems can include optical systems, including those using visible and invisible, e.g., infrared, light, which use cameras to detect the presence of a human in a field of view. However, such systems are subject to vibrations, bumps, jolts and other movements and disturbances that can affect audio and visual performance. Techniques for detecting and responding to such movements are needed.

SUMMARY

A processor-implemented method, motion capture system and tangible computer readable storage are provided for detecting motion in a 3-D depth camera in a motion capture system. Such depth cameras are used, for example, to detect movement of a user in a field of view and to translate the movements into control inputs to an application in the motion capture system. For example, the user may make hand gestures to navigate a menu, interact in a browsing or shopping experience, choose a game to play, or access communication features such as sending a message to a friend. Or, the user may use the hands, legs or the entire body to control the movement of an avatar in a 3-D virtual world.

The performance of the depth camera in tracking the user can be disturbed by a variety of sources relating to the environment in which the depth camera is located. Disturbances can include vibrations, e.g., due to a loudspeaker/subwoofer, a truck, train or airplane passing nearby, an earthquake or thunder, a disturbance to a vehicle such as a boat or ship in which the depth camera is located, and user movements such as jumping, running and playing in the room in which the depth camera is located. Disturbances can also include unintentional movements of the depth camera, such as if a user or a house pet were to accidentally brush by and move the depth camera, as well as intentional movements such as if the user were to attempt to reposition the depth camera. To detect and account for such disturbances, signals from an accelerometer in the depth camera can be processed using techniques which are effective in accurately detecting movement of the depth camera.

In one embodiment, a processor-implemented method for detecting motion in a 3-D depth camera is provided. The method includes the processor-implemented steps of obtaining acceleration readings in x-, y- and z-axes from a three-axis accelerometer in the 3-D depth camera at successive time points. The method further includes, for each time point: (a) obtaining short and long term running averages of the acceleration readings in each axis of the x-, y- and z-axes. The short term running average is taken over a number N1 time points, and the long term running average is taken over a number N2 time points. In one approach, N2=N1×1.5. In another approach, 1.3×N1<N2<1.7×N1. Particular definitions of short and long term averages can yield optimal accuracy in detecting movement.

The method further includes: (b) obtaining differences between the short and long term running averages of the acceleration readings for each axis of the x-, y- and z-axes, (c) obtaining absolute values of the differences for each axis of the x-, y- and z-axes, and (d) obtaining a sum based on the absolute values. The method further includes (e) determining if the sum exceeds a threshold level. A particular setting of the threshold level can yield optimal accuracy in detecting movement. If the sum exceeds the threshold level, the method include (f) providing an indication that movement of the 3-D depth camera is detected. Similarly, if the sum does not exceed the threshold level, the method further includes (g) providing an indication that movement of the 3-D depth camera is not detected.

In one possible approach, a motion tracking process is halted in response to the indication that movement of the 3-D depth camera is detected, and the motion tracking process is subsequently resumed in response to the indication that movement of the 3-D depth camera is no longer detected. It is also possible to provide a message via a user interface indicating that the 3-D depth camera has been disturbed, in response to the indication that movement of the 3-D depth camera is detected.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

DETAILED DESCRIPTION

Techniques are provided for accurately detecting when a sensor equipped with an accelerometer has been disturbed. In an example, the sensor is a depth camera in a motion tracking system. In one approach, readings from a three-axis accelerometer are processed to provide short and long term moving averages for each of the x, y and z axes. For each axis, a difference between the short and long term averages is obtained. A sum of the differences is obtained by summing the absolute value of each difference, across all three axes. This sum of differences is then compared to a threshold to determine if movement is detected. In another approach, the short and long term averages of the accelerometer readings are converted to pitch and roll values, and the pitch and roll values are separately compared to a threshold to determine if movement is detected.

Moreover, while the use of an accelerometer is explained particularly in connection with a depth camera in motion tracking system, the techniques provided are generally applicable for detecting movement of any audio or visual sensor peripheral device for a computer host needs which can communicate to the host its physical status regarding vibration, bumps or other physical displacements that could affect audio or visual performance. Input from the device to the host can be used to determine when to automatically recalibrate the sensors, to warn the user of excessive vibration or movement that could affect performance, or to provide independent confirmation that the user has accomplished certain tasks required in setting up the sensor.

Figure 1:
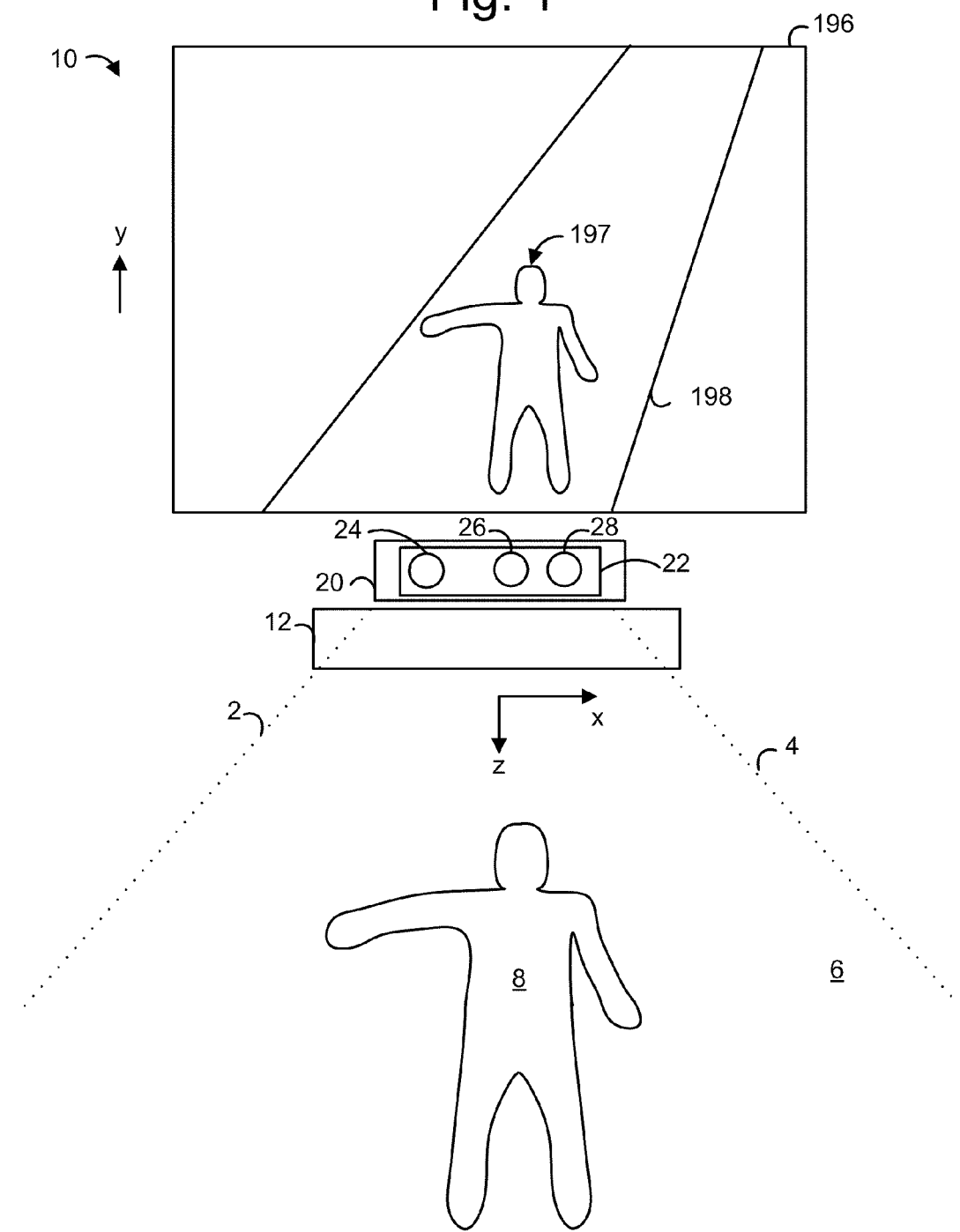
FIG. 1 depicts an example embodiment of a motion capture system.

FIG. 1 depicts an example embodiment of a motion capture system 10 in which a person 8 interacts with an application. This illustrates the real world deployment of a motion capture system, such as in the home of a user. The motion capture system 10 includes a display 196, a depth camera system 20, and a computing environment or apparatus 12. The depth camera system 20 may include an image camera component 22 having an infrared (IR) light emitter 24, an infrared camera 26 and a red-green-blue (RGB) camera 28. A user 8, also referred to as a person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the user 8. For example, the avatar may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. The perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track a human target. The computing environment 12 can include a computer, a gaming system or console, or the like, as well as hardware components and/or software components to execute applications.

The depth camera system 20 may include a camera which is used to visually monitor one or more people, such as the user 8, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the gestures and/or movements of the user are captured and used to animate an avatar or on-screen character and/or interpreted as input controls to the application being executed by computer environment 12.

Some movements of the user 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the user 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the user 8.

Figure 2A:
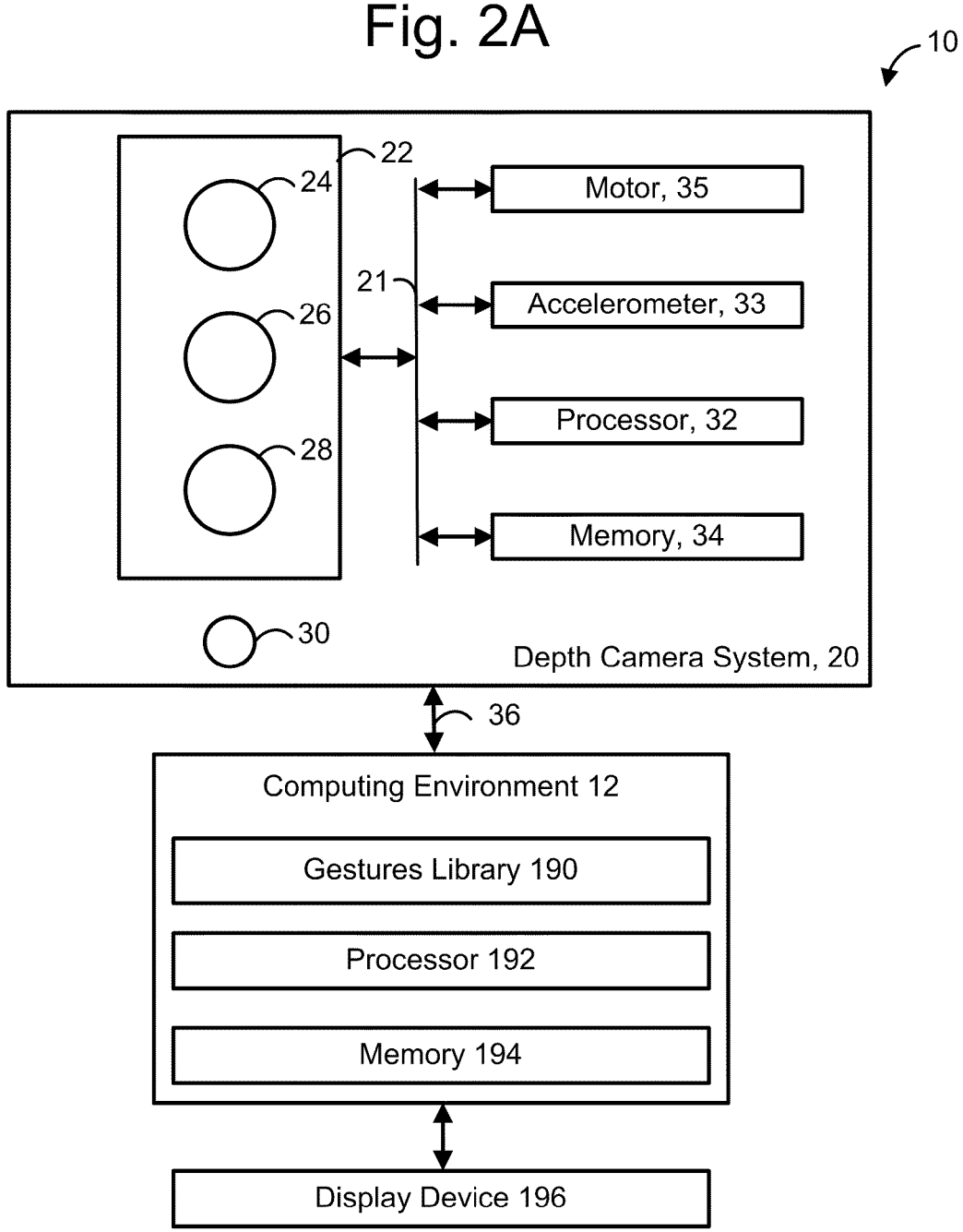
FIG. 2A depicts an example block diagram of the motion capture system of FIG. 1.

FIG. 2A depicts an example block diagram of the motion capture system of FIG. 1. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light emitter 24, an infrared camera 26, and a red-green-blue (RGB) camera 28 that may be used to capture the depth image of a scene. A 3-D camera is formed by the combination of the infrared emitter 24 and the infrared camera 26. For example, in time-of-flight analysis, the IR light emitter 24 emits infrared light onto the physical space and the infrared camera 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light emitter 24. Upon striking the surface of one or more targets or objects in the scene, the pattern may become deformed in response. Such a deformation of the pattern may be captured by, for example, the infrared camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may include a positioning motor 35 for repositioning the camera, and an accelerometer 33 for detecting movement of the depth camera. Regarding the motor 35, the camera may use the motor to automatically reposition itself in various situations. For instance, the camera may have a tilt motor to adjust the up-down/pitch, that is, how high the camera is looking. This repositioning can occur, e.g., when a different player begins interacting with an application in a motion capture system, at the beginning of a game application, or when the motion capture system starts up and begins searching to find people in a room. The camera may receive commands for activating the motor based on its own control logic and/or from external control logic, such as in the computing environment 12. The camera can include one or more accelerometers 33. For instance, an accelerometer can be mounted to a printed circuit board on which other circuitry of the camera is mounted. Techniques provided herein are usable with a two-axis accelerometer, where the third axis is fixed to prevent movement. Generally, the accelerometer can be a three-axis accelerometer which detects movement in three orthogonal axes, e.g., x, y, z axes. Typical modern accelerometers use micro electro-mechanical systems (MEMS) which are sensitive only to a direction in the plane of the die. By integrating two devices perpendicularly on a single die, a two-axis accelerometer can be made. By adding an additional out-of-plane device, acceleration in three axes can be measured. The accelerometer can provide samples of data at a specified sampling rate.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 2B:
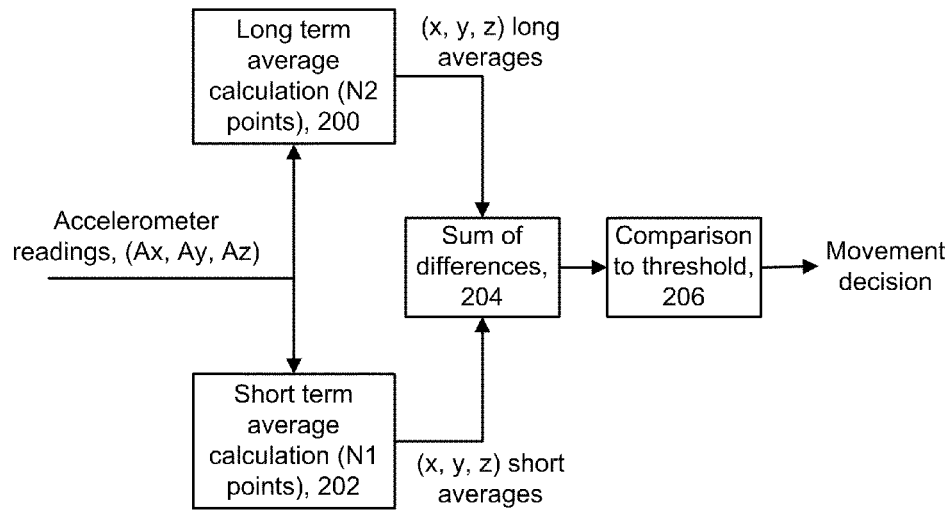
FIG. 2B depicts an example of processing blocks of the processor of the motion capture system of FIG. 2A.

FIG. 2B depicts an example of processing blocks of the processor of the motion capture system of FIG. 2A. For example, the processors 32 and/or 192 may process readings from the accelerometer 33. The readings can include acceleration readings Ax, Ay, Az in the x, y, z, directions, respectively. The readings can be in units of acceleration, e.g., $m/sec^2$, or in other units, such as voltage or current, which correspond to units of acceleration. This correspondence may be linear. The acceleration readings Ax, Ay, Az are raw data from the accelerometer, before the readings are processed as described herein. The processor can include a functional block 200 which determines a long term running average calculation over N2 time points, such as by using the current time point and the previous N2−1 time points. The running average is essentially a moving average. The output of the block 200 includes the x, y, z long term averages, also referred to as long averages. Similarly, the processor can include a functional block 202 which determines a short term running average calculation over N1 time points, such as by using the current time point and the previous N1−1 time points. The output of the block 202 includes the x, y, z short term averages, also referred to as short averages. A block 204 determines a sum of differences based on the long and short averages. Specifically, the sum can be based on the differences between the short and long averages for each of the x, y, z axes. The sum is compared to a threshold at a block 206 to determine whether movement is detected and to provide a corresponding output signal as a movement decision. The output signal can be used by a process which takes a specified action such as temporarily halting a motion tracking algorithm and/or providing a message to the user via a display indicating that a disturbance of the camera has been detected. The number of samples N1 and N2, or the associated time period, can be set based on calculated data values from the camera during experimentation.

Figure 2C:
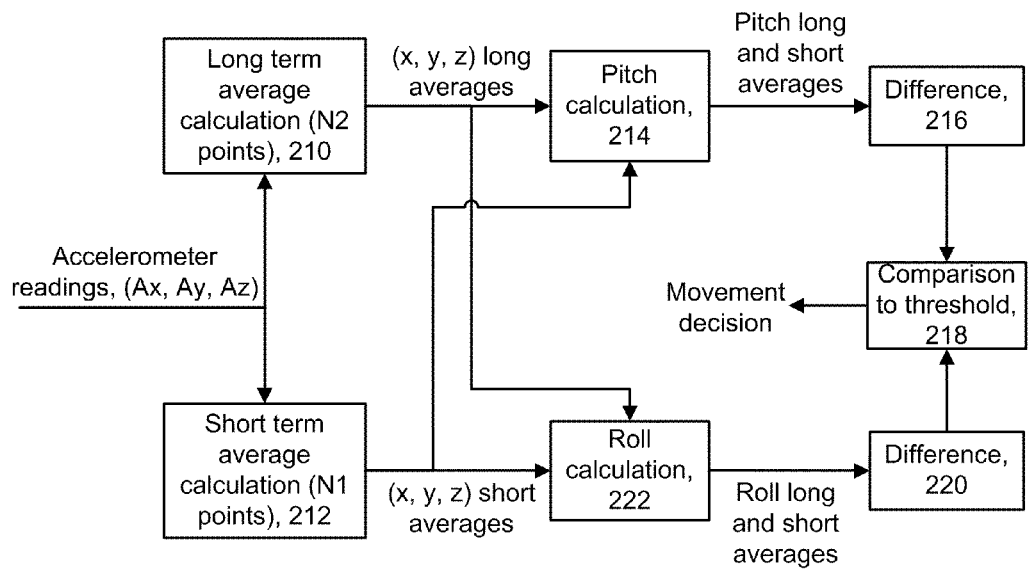
FIG. 2C depicts another example of processing blocks of the processor of the motion capture system of FIG. 2A.
Figure 9:
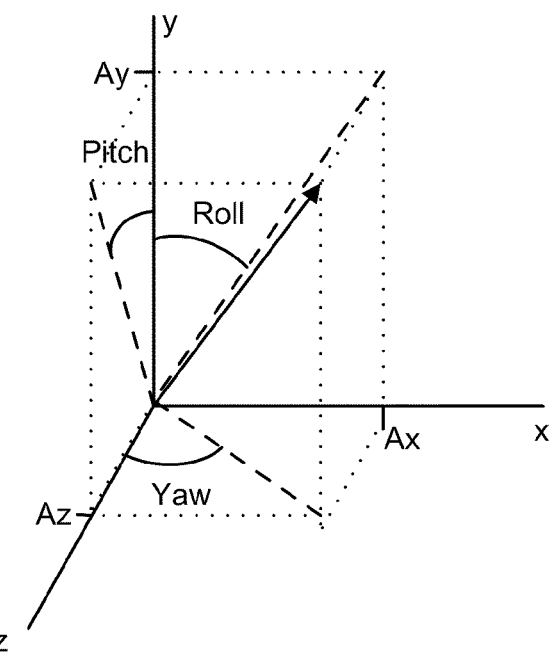
FIG. 9 depicts an example coordinate system used for processing accelerometer readings as set forth in FIGS. 7A and 7B.

FIG. 2C depicts another example of processing blocks of the processor of the motion capture system of FIG. 2A. Blocks 210 and 212 are similar to blocks 200 and 202, respectively, in FIG. 2B. The long and short averages are both processed at a pitch calculation block 214 and a roll calculation block 222. The pitch calculation block 214 provides pitch long and short term averages to a difference block 216, which determines the difference between the pitch long and short term average for each time point, and provides this difference to a comparison block 218. Similarly, the roll calculation block 222 provides roll long and short term averages to a difference block 220, which determines the difference between the roll long and short term average for each time point, and provides this difference to the comparison block 218. The comparison block 218 determines whether movement is detected based on either one or both of the differences, and provides a corresponding output signal as a movement decision. FIG. 9 depicts an example definition of pitch and roll.

Figure 3:
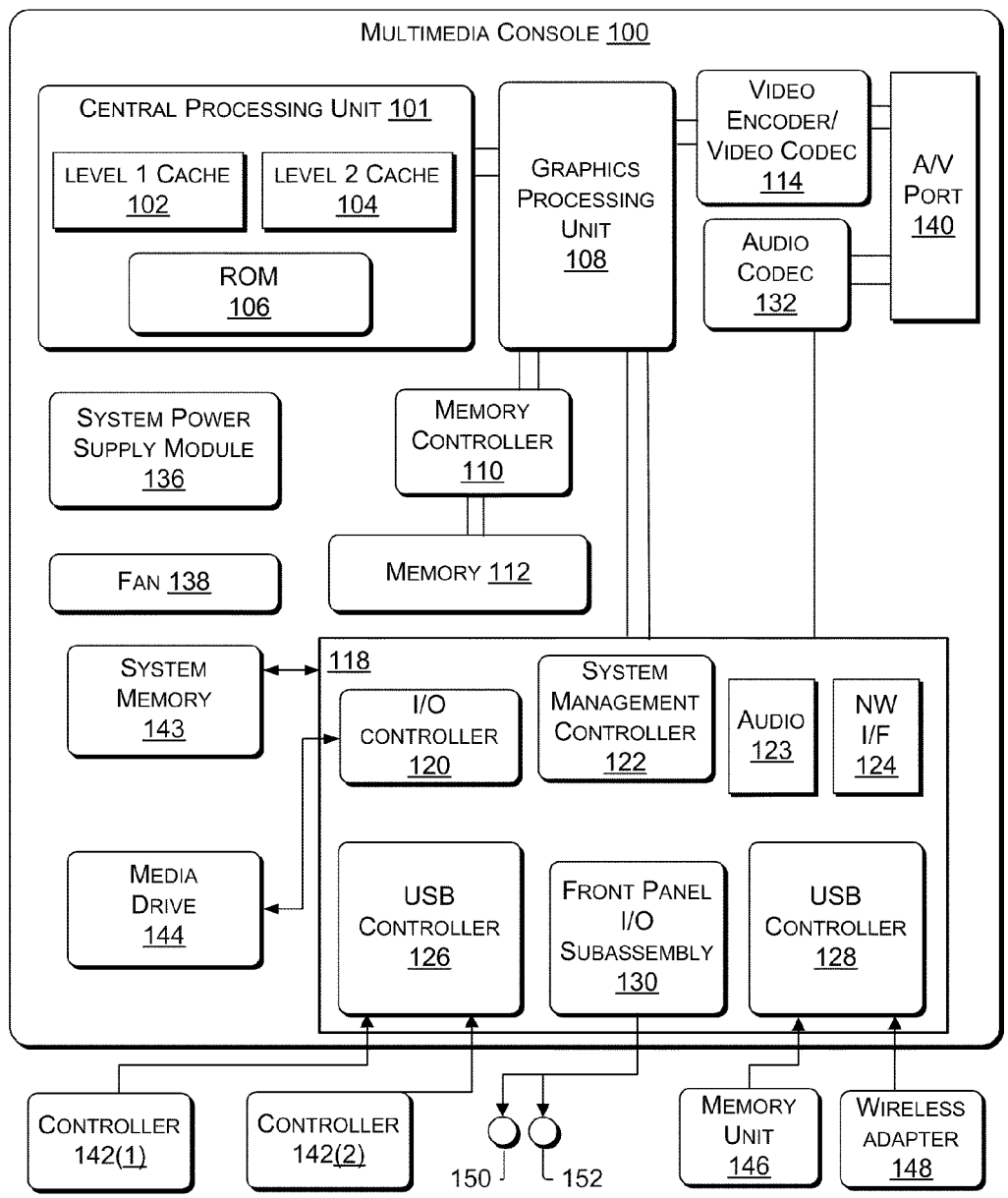
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2A, including the cameras 26 and 28.

Figure 4:
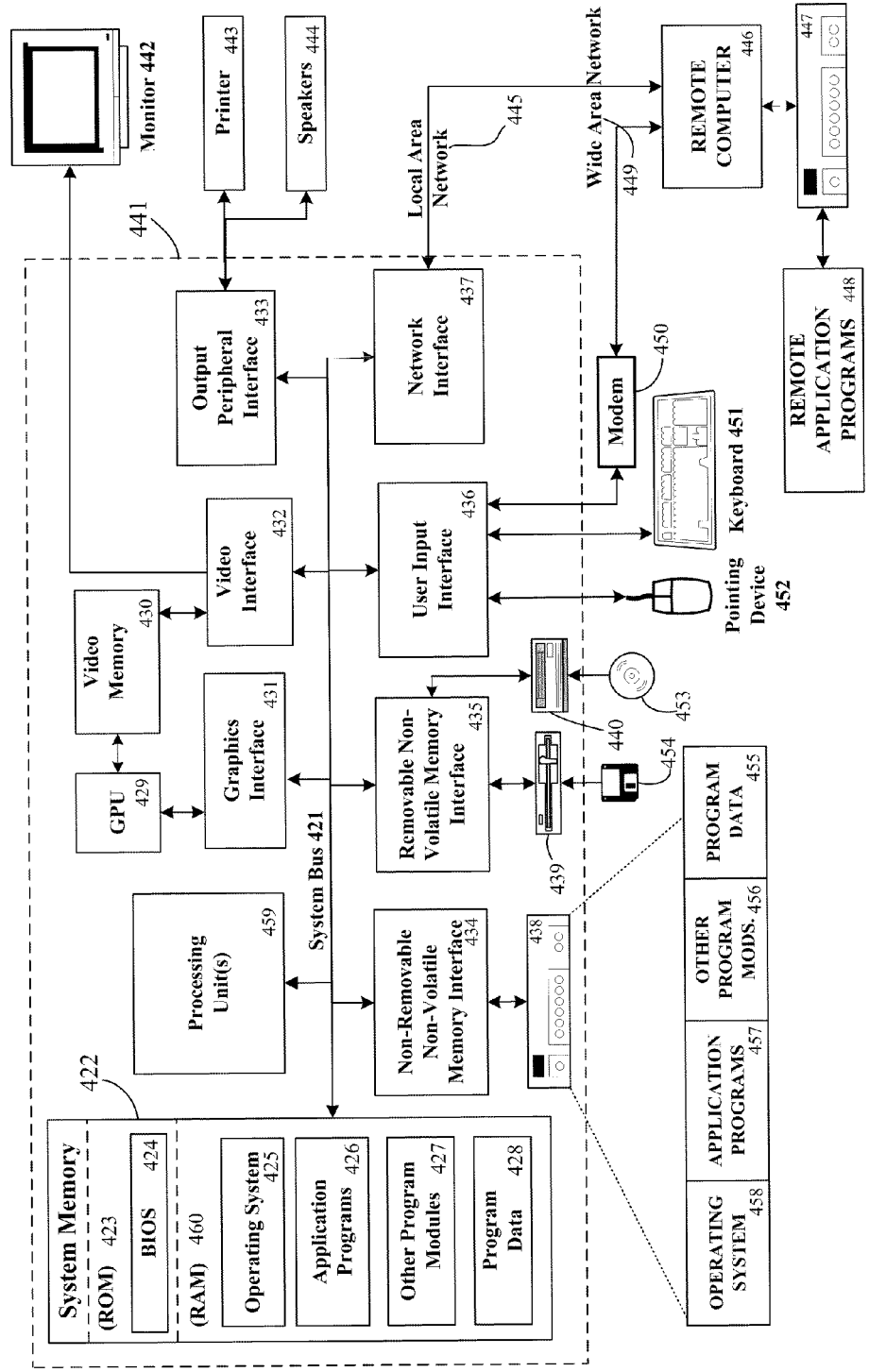
FIG. 4 depicts another example block diagram of a computing environment that may be used in the motion capture system of FIG. 1.

FIG. 4 depicts another example block diagram of a computing environment that may be used in the motion capture system of FIG. 1.

In a motion capture system, the computing environment can be used to interpret one or more gestures or other movements and, in response, update a visual space on a display. The computing environment 420 comprises a computer 441, which typically includes a variety of tangible computer readable storage media. This can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. A graphics interface 431 communicates with a GPU 429. An operating system 425, application programs 426, other program modules 427, and program data 428 are provided.

The computer 441 may also include other removable/non-removable, volatile/nonvolatile computer storage media, e.g., a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and depicted in FIG. 4, provide storage of computer readable instructions, data structures, program modules and other data for the computer 441. For example, hard disk drive 438 is depicted as storing operating system 458, application programs 457, other program modules 456, and program data 455. These components can either be the same as or different from operating system 425, application programs 426, other program modules 427, and program data 428. Operating system 458, application programs 457, other program modules 456, and program data 455 are given different numbers here to depict that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The depth camera system 20 of FIG. 2A, including cameras 26 and 28, may define additional input devices for the console 100. A monitor 442 or other type of display is also connected to the system bus 421 via an interface, such as a video interface 432. In addition to the monitor, computers may also include other peripheral output devices such as speakers 444 and printer 443, which may be connected through a output peripheral interface 433.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been depicted in FIG. 4. The logical connections include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 depicts remote application programs 448 as residing on memory device 447. It will be appreciated that the network connections shown are exemplary and other means of establishing a communications link between the computers may be used.

The computing environment can include tangible computer readable storage having computer readable software embodied thereon for programming at least one processor to perform a method as described herein. The tangible computer readable storage can include, e.g., one or more of components 422, 434, 435, 430, 453 and 454. Further, one or more processors of the computing environment can provide a processor-implemented method, comprising processor-implemented steps as described herein. A processor can include, e.g., one or more of components 429 and 459.

Figure 5:
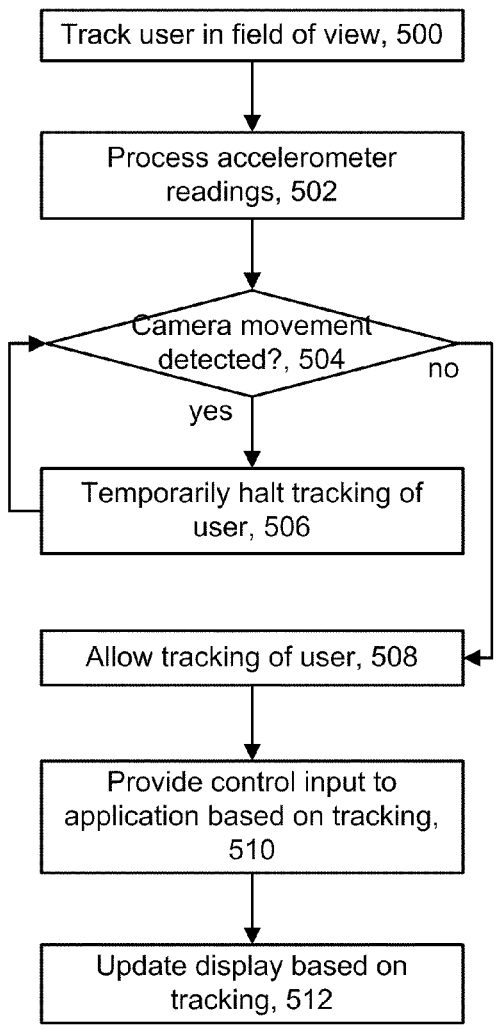
FIG. 5 depicts a method for detecting camera movement in a motion capture system.

FIG. 5 depicts a method for detecting camera movement in a motion capture system. Step 500 includes tracking a user in a field of view of a depth camera system. For further details, see, e.g., FIG. 6. Step 502 includes processing accelerometer readings. See, e.g., FIGS. 7A and 7B for further details. Decision step 504 determines if camera movement is detected. If decision step 504 is true, then an appropriate action is taken, such as temporarily halting tracking of the user, at step 506. This avoids erroneous tracking results which might otherwise occur if tracking were to continue despite the detected movement. Efficient tracking generally requires the camera to be substantially motionless. Decision step 504 will be true when the camera is currently moving or when it was previously moving very recently, such as within the time period over which an average is taken (such as described in connection with FIGS. 2B and 2C). If decision step 504 is false, then tracking of the user is allowed to continue, at step 508. Step 510 includes providing a control input to an application based on the tracking. For instance, the control input can be used to update the position of an avatar on a display, where the avatar represents the user. Step 512 includes updating the display based on the tracking.

When the tracking algorithm is temporarily halted, data may not be available for updating the display based on the normal update rate. One approach is to continue to display the last image before movement was detected. Another possible action to take when movement is detected at step 504 is to provide a message to the user via a display indicating that a disturbance of the camera has been detected. This message could be displayed as text, and/or audibly, such as by a synthesized spoken voice saying "Please reposition the camera" or "the camera has been disturbed." A warning sound such as a beep or buzzer could also be initiated during the period of detected movement and optionally for a predetermined time after the period of detected movement. The message could instruct the user as to how to avoid further disturbances in the future.

The temporary halting of the tracking algorithm can be achieved, e.g., by turning off the power to the depth camera, or by keeping power to the depth camera while providing a control signal in the logic to temporarily suspend certain tracking processes.

Figure 6:
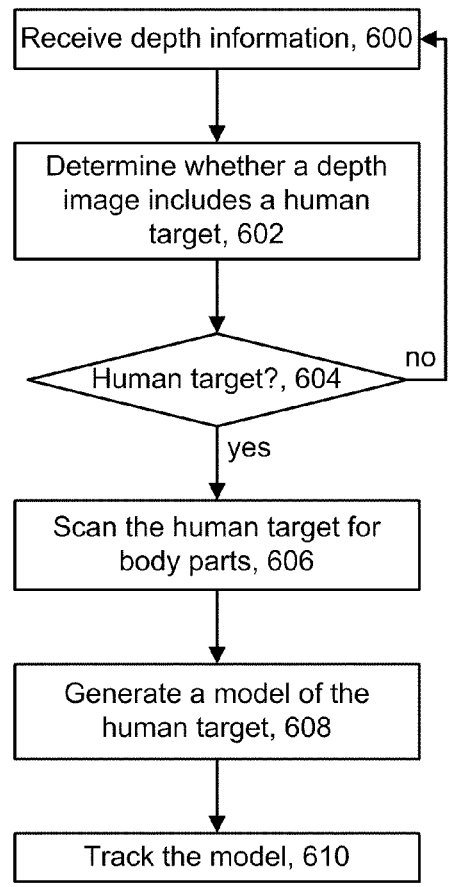
FIG. 6 depicts an example method for tracking movement of a person as set forth in step 500 of FIG. 5.

FIG. 6 depicts an example method for tracking movement of a person as set forth in step 500 of FIG. 5. The example method may be implemented using, for example, the depth camera system 20 and/or the computing environment 12, 100 or 420 as discussed in connection with FIGS. 2A-4. One or more people can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image or map having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information such that the depth information may used to generate a model such as a skeletal model, discussed also in connection with FIG. 8.

At decision step 604, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the human target. In one embodiment, measurement values determined by the scanned bitmask may be used to define one or more joints in a skeletal model. The one or more joints are used to define one or more bones that correspond to a body part of a human.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

Figure 7A:
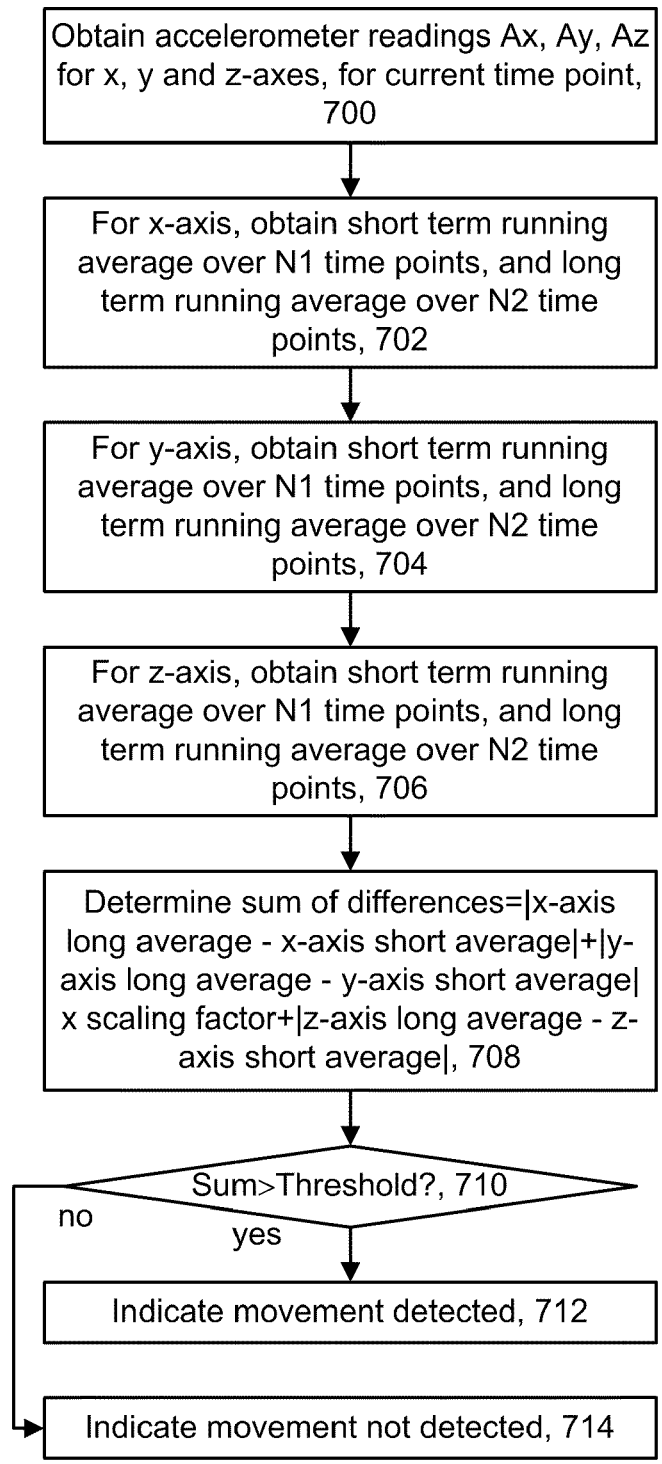
FIG. 7A depicts an example method for processing accelerometer readings for a current time period as set forth in step 502 of FIG. 5.

FIG. 7A depicts an example method for processing accelerometer readings for a current time period as set forth in step 502 of FIG. 5. Step 700 includes obtaining accelerometer readings Ax, Ay, Az for the x, y and z axes, respectively, for a current time point. For example, for a current time point or sample index t=i, the samples can be represented by Ax(i), Ay(i), Az(i). A sampling interval such as 15 msec. may be used, where additional samples are obtained for each sampled time point. The steps depicted apply to one time point and are repeated for each successive time point. The steps depicted need not necessarily occur discretely, but may occur concurrently, at least in part. For example, steps 702, 704 and 706 may occur concurrently, at least in part. For the x-axis reading, step 702 obtains a short term running average over a number N1 time points, and a long term running average over a number N2 time points. For example, the short term running average for the x-axis can be $$\frac{1}{N1} \sum_{t=i-N1+1}^{t=i} Ax(t).$$

The long term running average for the x-axis can be $$\frac{1}{N2} \sum_{t=i-N2+1}^{t=i} Ax(t).$$

For the y-axis reading, step 704 obtains a short term running average over N1 time points, and a long term running average over N2 time points. For the z-axis reading, step 706 obtains a short term running average over N1 time points, and a long term running average over N2 time points. In this example, the short and long term averages are defined similarly for the different axes. However, it is also possible to use a different number of time points/averaging period for the short and long term averages for each of the three different axes.

Experimentation can be used to determine the optimal number of time points, or the averaging period, for each axis, and for the long and short averages, for a particular implementation. Furthermore, experimentation can be used to determine the optimal ratio of N2/N1 for a particular implementation. A ratio of N2/N1=1.5 has been found to be successful in some implementations. That is, N2 exceeds N1 by about 50%. Generally, 1.3×N1<N2<1.7×N1 may be used. Furthermore, with a 15 msec. sampling interval, N1=40 and N2=60 have been successfully used, so that the time interval over which to take the short and long averages (the averaging period) is 600 msec. and 900 msec., respectively. N1 and N2 are positive integers, and N2<N1. This is an example implementation and, as mentioned, the optimum values for a particular implementation can be determined by experimentation. Generally, if N2 exceeds N1 by too much, the indication of movement is delayed too long. If N2 and N1 are too close, so that N2 does not sufficiently exceed N1, some indications of movement will be missed. A further consideration is that a minimum length of the short average should generate a sufficiently stable time line to eliminate most spurious vibrations.

Step 708 determines a sum of differences based on: |x-axis long average−x-axis short average|+|y-axis long average−y-axis short average|x scaling factor+|z-axis long average−z-axis short average|. |x-axis long average−x-axis short average| represents an absolute value of the difference between the x-axis long term average and the x-axis short term average for the current time point. |y-axis long average−y-axis short average| represents an absolute value of the difference between the y-axis long term average and the y-axis short term average for the current time point. The y-axis may represent a vertical direction. A scaling factor may be used to reduce or attenuate the effects of vertical movements in the decision of whether to indicate camera movement. Vibrations due to sources such as speakers near the camera, people walking or jumping near the camera or any other disturbance that can be communicated through a surface on which the camera rests, are most pronounced on the vertical axis. With a scaling factor, the accelerometer data which represents movement in the vertical axis is attenuated relative to the accelerometer data which represents movement in the x or z axis. This can achieve better results by avoiding false movement detections due to commonplace y-axis vibrations. On the other hand, movements due to the camera moving by its motor, such as by tilting up or down, or from being moved by an external source, such as by a user, tend to be more pronounced or approximately equal in the x and z axes. The scaling factor can be separate from a correction of gravity effects in the vertical direction, or combined with such a correction. The scaling factor can be about 20% (0.2), for instance, or about 10-33% (0.10-0.33), for instance. The scaling factor can be optimized through experimentation.

|z-axis long average−z-axis short average| represents an absolute value of the difference between the z-axis long term average and the z-axis short term average for the current time point. Motions generally appear as vibrations on all three axes, so that averaging readings from all three axes advantageously reduces vibration noise which is inherent in accelerometers. Moreover, the techniques provided herein do not require the camera to be level for movement detection. Techniques which indicate motion based on movement beyond a threshold in a single axis can provide inconsistent results.

At decision step 710, if the sum is greater than a threshold, step 712 provides an indication that movement is detected. On the other hand, at decision step 710, if the sum is not greater than the threshold, step 714 provides an indication that movement is not detected. Optionally, the indication at step 712 may not be provided until movement is detected for a specified number of one or more samples. Similarly, the indication at step 714 may not be provided until movement is detected for a specified number of one or more samples. An optimum threshold in decision step 710 can be determined based on experimentation. The threshold should be high enough so that movement is not detected in situations where the level of movement is acceptable and the tracking algorithm can continue tracking a user with acceptable performance. On the other hand, the threshold should be low enough so that movement is detected in situations where the level of movement is not acceptable and the tracking algorithm cannot continue tracking a user with acceptable performance. Experimentation which is used to determine an optimal threshold level can use a metric of tracking performance.

See FIGS. 10A-11C for example data generated based on FIG. 7A.

Figure 7B:
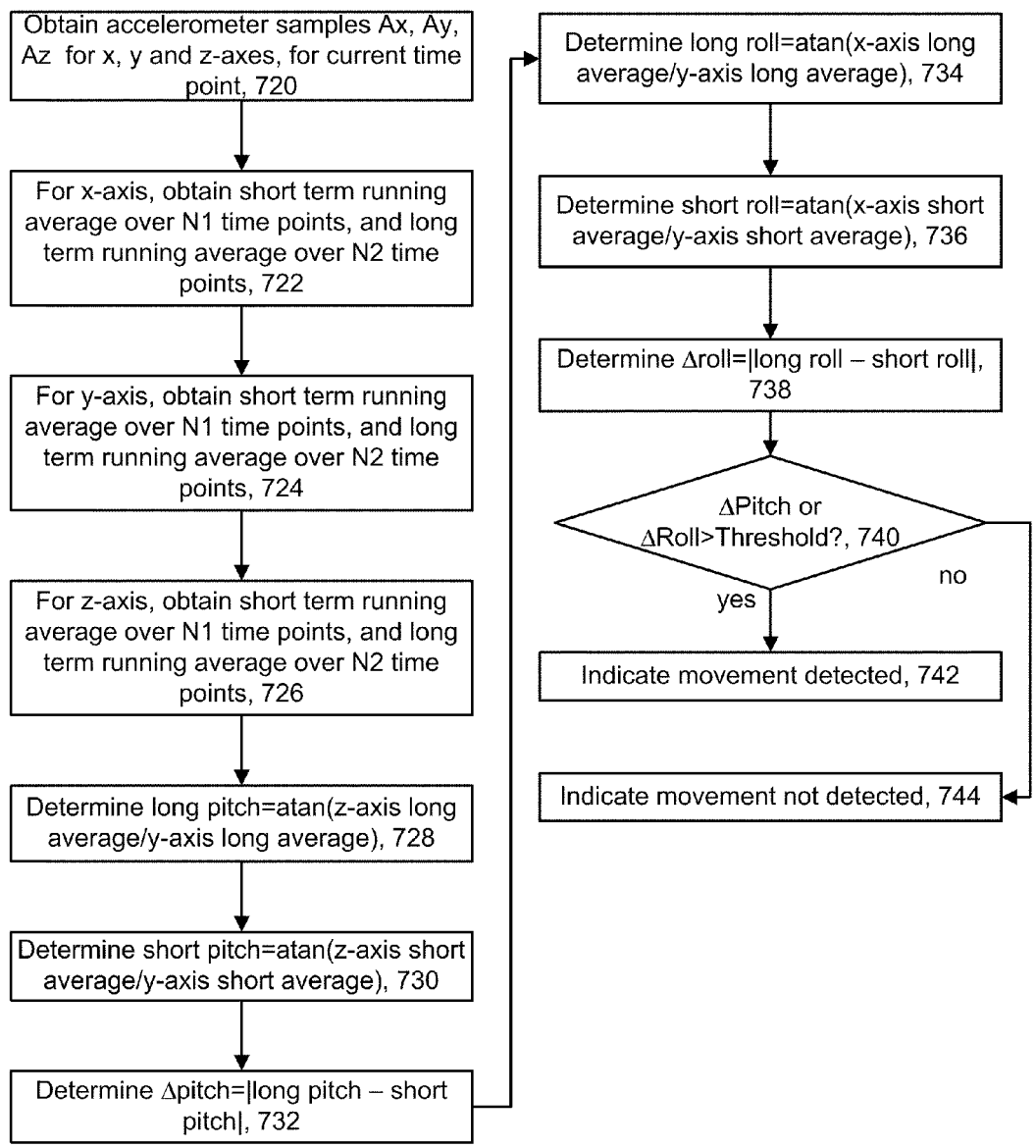
FIG. 7B depicts another example method for processing accelerometer readings for a current time period as set forth in step 502 of FIG. 5.

FIG. 7B depicts another example method for processing accelerometer readings for a current time period as set forth in step 502 of FIG. 5. Steps 720, 722, 724 and 726 correspond to steps 700, 702, 704 and 706, respectively, of FIG. 7A. Step 728 determines a pitch angle based on the long term average values of steps 724 and 726. With the convention of FIG. 9, the pitch angle of the camera is equal to the inverse tangent of z divided by y, where z and y are Az(i) and Ay(i), respectively, at a sample index i. Thus, step 728 determines long pitch=a tan(z-axis long average/y-axis long average). Long pitch is the pitch for the current sample based on the long term averages of Az and Ay for the current sample. A tan is the inverse tangent. Similarly, step 730 determines short pitch=a tan(z-axis short average/y-axis short average). Short pitch is the pitch for the current sample based on the short term averages of Az and Ay for the current sample. A change in the pitch angle, Δpitch, can be determined based on the difference between the long and short term pitches of steps 728 and 730, respectively, as Δpitch=|long pitch−short pitch|.

Similarly, with the convention of FIG. 9, the roll angle of the camera is equal to the inverse tangent of x divided by y, where x and y are Ax(i) and Ay(i), respectively, at a sample index i. Ay(i) can be scaled to remove gravitational effects and/or to attenuate common vertical motions. Step 734 determines long roll=a tan(x-axis long average/y-axis long average). Long roll is the roll for the current sample based on the long term averages of Ax and Ay for the current sample. Similarly, step 736 determines short roll=a tan(x-axis short average/y-axis short average). Short roll is the roll for the current sample based on the short term averages of Ax and Ay for the current sample. A change in the roll angle, Δroll, can be determined based on the difference between the long and short term roll angles of steps 734 and 736, respectively, as Δroll=|long roll−short roll|.

In one implementation, decision step 740 compares both Δpitch and Δroll to an angle threshold, in units of degrees or radians (different than step 710 of FIG. 7A). If one or both of Δpitch and Δroll exceed the threshold, step 742 provides an indication that movement is detected. If neither of Δpitch and Δroll exceeds the threshold, step 744 provides an indication that movement is not detected. In another possible implementation, movement is indicated only if both of Δpitch and Δroll exceed the threshold. Another possible implementation compares Δpitch to one threshold and compares Δroll to another threshold. Movement is indicated if one or more of the thresholds is exceeded. Experimentation can be used to set an optimal threshold. This approach converts acceleration readings into angles so that a comparison to a threshold is made based on angles rather than raw acceleration readings (as in FIG. 7A). Optionally, the indication at step 742 may not be provided until movement is detected for a specified number of one or more samples. Similarly, the indication at step 744 may not be provided until movement is detected for a specified number of one or more samples.

In another possible implementation, decision step 740 compares the sum of the absolute values of Δpitch and Δroll to an angle threshold, e.g., |Δpitch|+|Δroll|.

As mentioned in connection with FIG. 2A, the camera may have a motor for repositioning itself. A further approach integrates control signals which indicate whether the camera is repositioning itself with data from the accelerometer. Generally, the accelerometer will indicate movement when the positioning motor is operating. In some cases, the accelerometer will also indicate movement when the positioning motor is not operating. For example, when a motorized positioning is completed, a control signal indicates that the motor is not operating. The control signal can be based, e.g., on a sensor which detects that the positioning motor is not operating. However, due to some play in the positioning motor and/or its attachment to the camera, the camera may continue to move for a short time, e.g., a fraction of a second, after a control signal indicates that the motor is no longer operating. In this case, the accelerometer can detect this movement and provide an appropriate action such as delaying motion tracking.

Thus, the positioning motor and the accelerometer may provide contrary indications. In one approach, an indication is provided that the positioning motor is not operating, while it is detected that the positioning motor is not operating. This approach halts a motion tracking process in response to an indication that movement of the depth camera is detected by the accelerometer, even during the indication that the positioning motor is not operating. Thus, the accelerometer indication takes priority.

In another situation, an indication is provided that the positioning motor is operating, while it is detected that the positioning motor is operating. This approach halts a motion tracking process in response to an indication that the positioning motor is operating, even during an indication that movement of the depth camera is not detected by the accelerometer. Thus, the positioning motor takes priority. Generally, it can be concluded that there is movement of the camera if one or both of the positioning motor and the accelerometer indicate there is movement. This is a conservative approach which seeks to avoid missing an actual movement.

Another possible approach uses multiple accelerometers. One implementation processes the readings collectively from each axis, across the multiple accelerometers. For example, assume two accelerometers are used. For each time point, Ax, Ay and Az samples are obtained from the two accelerometers, e.g., as Ax1(i), Ax2(i), Ay1(i), Ay2(i), Az1(i) and Az2(i). The two Ax samples, Ax1(i) and Ax2(i), can be averaged to obtain a single Ax(i) sample which is treated the same as in the case of a single accelerometer. Similarly, the two Ay samples, Ay1(i) and Ay2(i), can be averaged, and the two Az samples, Az1(i) and Az2(i), can be averaged. Thus, the short and long term running averages are obtained from readings from the multiple three-axis accelerometers, by averaging across readings from the multiple three-axis accelerometers.

In another possible implementation, readings from each accelerometer are used to determine whether motion is detected, and a majority vote is taken to determine whether to provide an indication of motion. For example, three accelerometers may be used in this case, so that a majority vote will be decisive. Thus, movement is indicated if two or three of the accelerometers indicate movement; otherwise, movement is not indicated.

Figure 8:
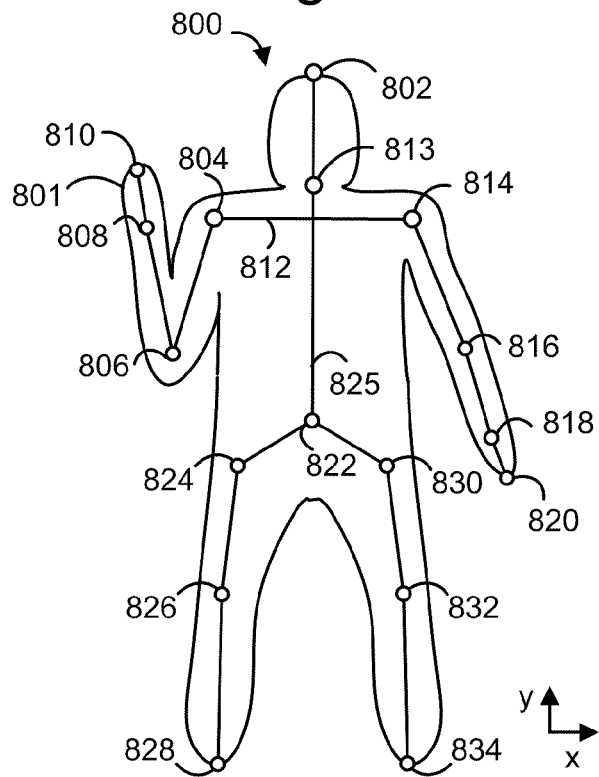
FIG. 8 depicts an example model of a user as set forth in step 608 of FIG. 6.

FIG. 8 depicts an example model of a user as set forth in step 608 of FIG. 6. The model 800 is facing the depth camera, in the −z direction, so that the cross-section shown is in the x-y plane. Note the vertical y-axis and the lateral x-axis. A similar notation is provided in other figures. The model includes a number of reference points, such as the top of the head 802, bottom of the head or chin 813, right shoulder 804, right elbow 806, right wrist 808 and right hand 810, represented by a fingertip area, for instance. The right and left side is defined from the user's perspective, facing the camera. The model also includes a left shoulder 814, left elbow 816, left wrist 818 and left hand 820. A waist region 822 is also depicted, along with a right hip 824, right knew 826, right foot 828, left hip 830, left knee 832 and left foot 834. A shoulder line 812 is a line, typically horizontal, between the shoulders 804 and 814. An upper torso centerline 825, which extends between the points 822 and 813, for example, is also depicted.

FIG. 9 depicts an example coordinate system used for processing accelerometer readings as set forth in FIGS. 7A and 7B. Any desired coordinate system can be used. In this example, the y-axis is a vertical axis, the z axis is parallel to the camera axis, e.g., the direction in which the camera looks, and the x axis extends laterally to the camera axis. A vector extending for the origin represents an acceleration vector for a given reading, where the acceleration vector has components Ax, Ay, Az along the x, y, z directions respectively. A pitch angle can be defined based on the tangent of Az/Ay. A roll angle can be defined based on the tangent of Ax/Ay. A yaw angle can be defined based on the tangent of Ax/Az. In one approach, the x axis runs horizontally sideways through the camera, the y axis is vertical and the z axis runs horizontally from the front to the back of the camera. Generally, changes in pitch, roll and yaw can be detected.

Figure 10A:
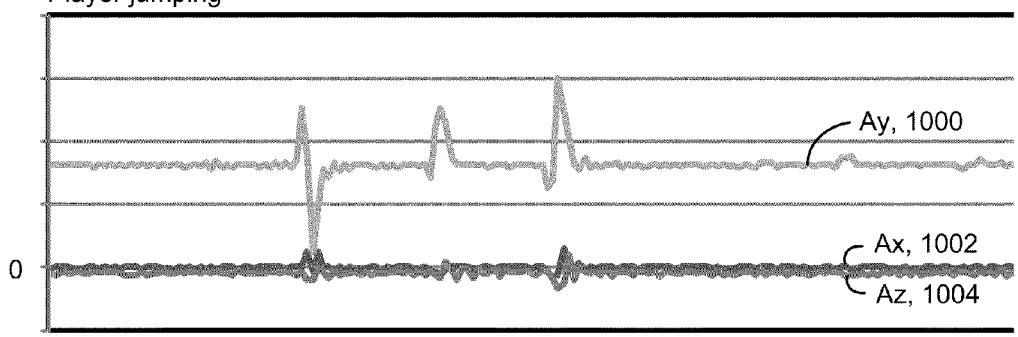
FIG. 10A depicts example raw accelerometer readings in a scenario where a player is jumping.

FIG. 10A depicts example raw accelerometer readings in a scenario where a player is jumping. For example, one or more players may be jumping around, running or otherwise playing in a room in which the depth camera is located. The camera is resting on a surface which receives vibrations from the floor of the room when the players are jumping. Waveforms 1000, 1002 and 1004 depict the raw accelerometer readings in the y, x and z axes, respectively, for successive time points. The horizontal axis indicates progressing time, from left to right, and the vertical axis indicates amplitude. Ay is substantially higher than Ax and Az because it is not yet corrected for gravity in this example. It can be seen that there are three separate disturbances. Some noise is present at the other times.

Figure 10B:
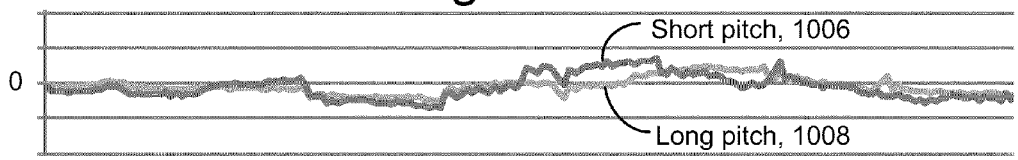
FIG. 10B depicts long and short term average pitch values, based on FIG. 10A.

FIG. 10B depicts long and short term average pitch values, at waveforms 1008 and 1006, respectively, based on FIG.

10A. It can be seen that some of the peaks in waveform 1008 occur later relative to corresponding peaks in the waveform 1006 due to the nature of a long-term average vs. a short-term average.

Figure 10C:
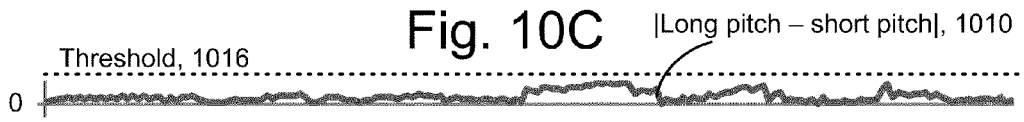
FIG. 10C depicts a difference between the long and short term average pitch values of FIG. 10B.

FIG. 10C depicts a difference between the long and short term average pitch values of FIG. 10B. The corresponding data for roll and/or yaw is not depicted but would be similar in nature to the waveform of FIG. 10C. Waveform 1010 depicts a difference between waveforms 1008 and 1006, and threshold 1016 is an angle threshold such as in step 740 of FIG. 7B. The waveform 1010 does not exceed the angle threshold 1016, indicating that no motion is detected. In comparing FIG. 10C and FIG. 10D, it can be seen that the results are consistent in that movement is not detected with either technique.

Figure 10D:
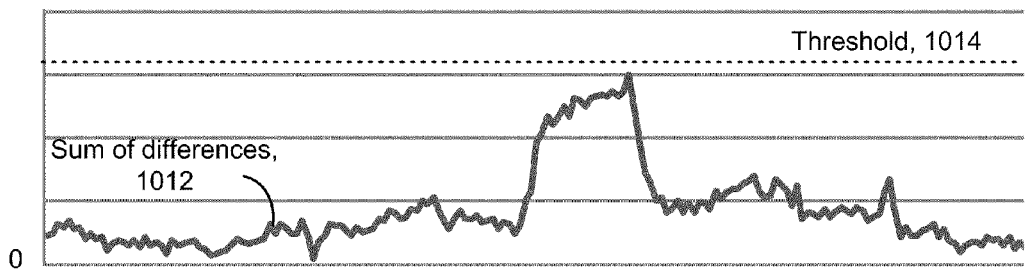
FIG. 10D depicts a sum of differences and comparison to a threshold, based on the averages of the axis data depicted in FIG. 10A indicating when movement is detected that does not meet the threshold and is filtered out.

FIG. 10D depicts a sum of differences and comparison to a threshold, based on FIG. 10A indicating when movement is detected. The waveform 1012 depicts the sum of the differences (step 708, FIG. 7A). This is |x-axis long average–x-axis short average|+|y-axis long average–y-axis short average|x scaling factor+|z-axis long average–z-axis short average|. In this example, the waveform 1012 does not exceed a threshold level 1014 (step 710, FIG. 7A), so that movement is not detected for the time period depicted. Thus, in one approach, the waveform 1012 is the sum of three waveforms, which are based on the average of the individual axes represented by waveforms 1000, 1002 and 1004. FIGS. 10A-D are roughly time-aligned with one another.

Figure 11A:
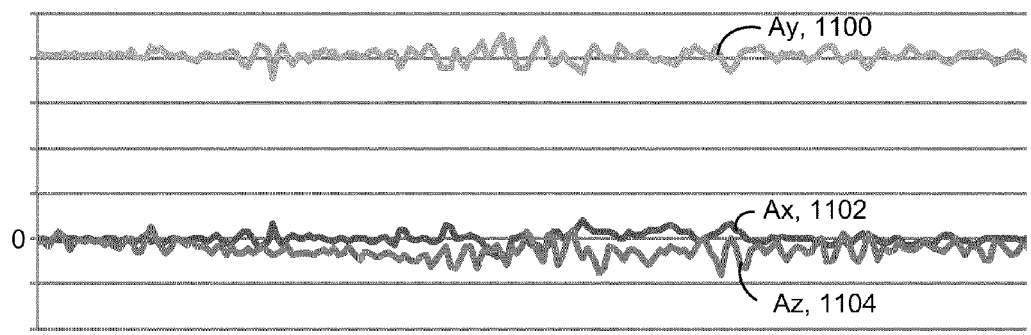
FIG. 11A depicts example raw accelerometer readings in a scenario where a sensor is moved.

FIG. 11A depicts example raw accelerometer readings in a scenario where a sensor is moved. For example, a user may manually alter the position of the depth camera while it is operating. Waveforms 1100, 1102 and 1104 depicts the raw accelerometer readings in the y, x and z axes, respectively, for successive time points. The horizontal axis indicates progressing time, and the vertical axis indicates amplitude. As before, Ay is substantially higher than Ax and Az because it is not yet corrected for gravity in this example.

Figure 11B:
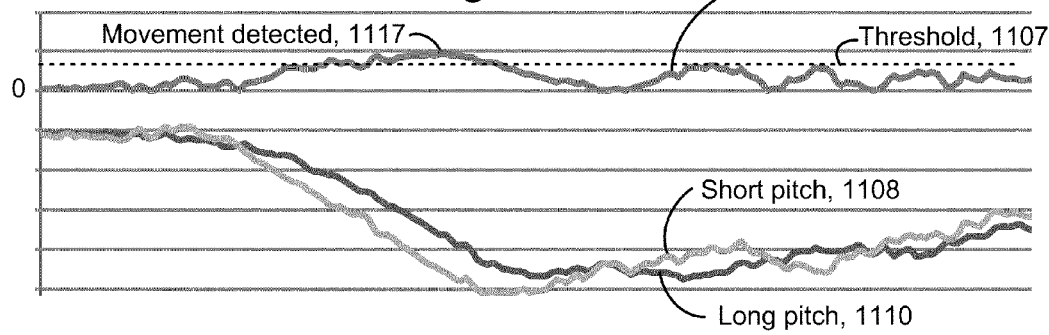
FIG. 11B depicts long and short term average pitch values, and a difference between the long and short term average pitch values, based on FIG. 11A.

FIG. 11B depicts long and short term average pitch values, at waveforms 1110 and 1108, respectively, and a difference between the long and short term average pitch values at waveform 1106, based on FIG. 11A. The corresponding data for roll and/or yaw is not depicted but would be analogous to the waveform of FIG. 11B. Waveforms 1108 and 1110 are shown as being offset slightly from zero at the start of the waveforms, on the left hand side, so that their detail can be seen. An angle threshold 1107 (step 740, FIG. 7B) is also depicted. A portion 1117 of the waveform 1106 exceeds the threshold 1107, indicating that movement is detected.

Figure 11C:
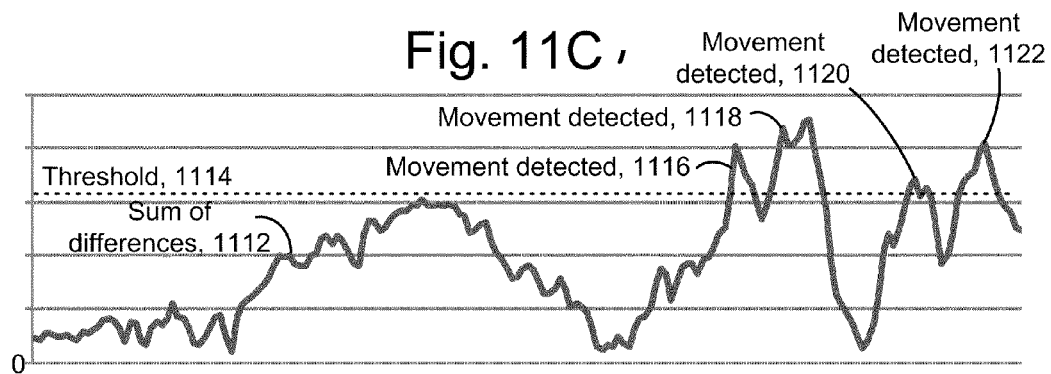
FIG. 11C depicts a sum of differences and comparison to a threshold, based on the averages of the axis data depicted in FIG. 11A indicating when movement is detected that meets or exceeds the threshold and is indicated as detected movement.

FIG. 11C depicts a sum of differences and comparison to a threshold, based on FIG. 11B and corresponding data for roll and/or yaw, indicating when movement is detected. The waveform 1012 depicts the sum of the differences (step 708, FIG. 7A). The waveform 1112 exceeds a threshold level 1114 (step 710, FIG. 7A) at waveform portions 1116, 1118, 1120 and 1122, so that movement is detected for these waveform portions and the respective time ranges. Thus, in one approach, the waveform 1112 is the sum of three waveforms, which are based on the average of the individual axes represented by waveforms 1100, 1102 and 1104. FIGS. 11A-C are roughly time-aligned with one another.

In comparing FIG. 11B and FIG. 11C, it can be seen that the results can differ in that movement can be detected at different times. Although, the effects of roll and/or yaw are not depicted separately.

FIGS. 10A-11C are examples of the implementation of FIG. 7A. Corresponding waveforms can be provided for the implementation of FIG. 7B by processing the raw data of FIG. 10A or 11A according to the steps of FIG. 7B.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A processor-implemented method for detecting motion in a 3-D depth camera, comprising the processor-implemented steps of:
   obtaining acceleration readings for x-, y- and z-axes from a three-axis accelerometer in the 3-D depth camera at successive time points, and for each time point:
      obtaining short and long term running averages of the acceleration readings for each axis of the x-, y- and z-axes, where x-axis long average, y-axis long average and z-axis long average are the long term running averages of the acceleration readings for the x-, y- and z-axes, respectively, and x-axis short average, y-axis short average and z-axis short average are the short term running averages of the acceleration readings for the x-, y- and z-axes, respectively;
      obtaining differences between the short and long term running averages of the acceleration readings for each axis of the x-, y- and z-axes;
      obtaining absolute values of the differences for each axis of the x-, y- and z-axes, where |x-axis long average–x-axis short average| is the absolute value of the differences for the x-axis, |y-axis long average–y-axis short average| is the absolute value of the differences for the y-axis, and |z-axis long average–z-axis short average| is the absolute value of the differences for the z-axis;
      obtaining a sum from: |x-axis long average–x-axis short average|+{scaling factor x |y-axis long average–y-axis short average|}+|z-axis long average–z-axis short average|, where 0<scaling factor<1 and the y-axis is a vertical axis, so that movement in the vertical axis is attenuated relative to movement in the x or z axis;
      determining if the sum exceeds a threshold level;
      if the sum exceeds the threshold level, providing an indication that movement of the 3-D depth camera is detected; and
      if the sum does not exceed the threshold level, providing an indication that movement of the 3-D depth camera is not detected.

2. The processor-implemented method of claim 1, further comprising:
   halting a motion tracking process in response to the indication that movement of the 3-D depth camera is detected; and
   subsequently resuming the motion tracking process in response to the indication that movement of the 3-D depth camera is no longer detected.

3. The processor-implemented method of claim 1, wherein:
   for each time point, and for at least one axis of the x-, y- and z-axes, the short term running average is taken over a number N1 of the successive time points, and the long term running average is taken over a number N2 of the successive time points, where $1.3 \times N1 < N2 < 1.7 \times N1$.

4. The processor-implemented method of claim 1, wherein:
for each time point, and for each axis of the x-, y- and z-axes, the short term running average is taken over a number N1 of the successive time points, and the long term running average is taken over a number N2 of the successive time points, where $1.3 \times N1 < N2 < 1.7 \times N1$.

5. The processor-implemented method of claim 1, further comprising:
providing a message via a user interface indicating that the 3-D depth camera has been disturbed, in response to the indication that movement of the 3-D depth camera is detected.

6. The processor-implemented method of claim 1, wherein the 3-D depth camera includes a positioning motor, the method further comprising:
providing an indication that the positioning motor is not operating, while it is detected that the positioning motor is not operating; and
halting a motion tracking process in response to the indication that movement of the 3-D depth camera is detected, even during the indication that the positioning motor is not operating.

7. The processor-implemented method of claim 6, further comprising:
providing an indication that the positioning motor is operating, while it is detected that the positioning motor is operating; and
halting a motion tracking process in response to the indication that the positioning motor is operating, even during the indication that movement of the 3-D depth camera is not detected.

8. Tangible computer readable storage device having computer readable software embodied thereon for programming at least one processor to perform a method for detecting motion in a 3-D depth camera, the method comprising:
obtaining time points of acceleration readings for x-, y- and z-axes from a three-axis accelerometer in the 3-D depth camera, and for each time point:
obtaining short and long term running averages of the acceleration readings in each axis of the x-, y- and z-axes, where, and for at least one axis of the x-, y- and z-axes: the short term running average of the acceleration readings is taken over a number N1 of the time points as $1/N1 \sum_{t=i-N1+1}^{t=i} A(t)$, where $A(t)$ represents samples of the acceleration readings along the at least one axis of the x-, y- and z-axes at the time point, $t$ represents the time point, the long term running average of the acceleration readings is taken over a number N2 of the time points as $1/N2 \sum_{t=i-N2+1}^{t=i} A(t)$, and $1.3 \times N1 < N2 < 1.7 \times N1$;
based on the short and long term running averages of the acceleration readings: obtaining short and long term change in pitch values of the 3-D depth camera, and short and long term change in roll values of the 3-D depth camera;
obtaining differences between the short and long term change in pitch values;
obtaining absolute values of the differences between the short and long term change in pitch values;
obtaining differences between the short and long term change in roll values;
obtaining absolute values of the differences between the short and long term change in roll values;
determining if a threshold is exceeded by at least one of: (a) the absolute values of the differences between the short and long term change in pitch values and (b) the absolute values of the differences between the short and long term change in roll values; and
providing an indication that movement of the 3-D depth camera is detected when the threshold is exceeded.

9. The tangible computer readable storage device of claim 8, wherein the method performed further comprises:
providing an indication that movement of the 3-D depth camera is not detected when the threshold is not exceeded.

10. The tangible computer readable storage device of claim 9, wherein the method performed further comprises:
halting a motion tracking process in response to the indication that movement of the 3-D depth camera is detected; and
subsequently resuming the motion tracking process in response to the indication that movement of the 3-D depth camera is no longer detected.

11. The tangible computer readable storage device of claim 8, wherein the method performed further comprises:
halting a motion tracking process in response to the indication that movement of the 3-D depth camera is detected.

12. The tangible computer readable storage device of claim 8, wherein the 3-D depth camera includes a positioning motor, and method performed further comprises:
providing an indication that the positioning motor is not operating, while it is detected that the positioning motor is not operating; and
halting a motion tracking process in response to the indication that movement of the 3-D depth camera is detected, even during the indication that the positioning motor is not operating.

13. A motion capture system, comprising:
a 3-D depth camera having a field of view, and comprising at least one three-axis accelerometer, the at least one three-axis accelerometer provides acceleration readings for x-, y- and z-axes at time points;
a display;
one or more processors associated with the 3-D depth camera, the one or more processors execute instructions to track movement of a user in the field of view and to provide a signal to the display to display images based on the tracked movement; and
wherein the one or more processors: (a) to detect movement of the 3-D depth camera, obtain short and long term running averages from the at least one three-axis accelerometer, determine differences between the short and long term running averages, and obtain a sum based on the differences, and compare the sum to a threshold level, where the short term running averages are taken over a number N1 of the time points as $1/N1 \sum_{t=i-N1+1}^{t=i} Ax(t)$, $1/N1 \sum_{t=i-N1+1}^{t=i} Ay(t)$ and $1/N1 \sum_{t=i-N1+1}^{t=i} Az(t)$ for the x-, y- and z-axes, respectively, where $Ax(t)$, $Ay(t)$ and $Az(t)$ represent samples of the acceleration readings for the x-, y- and z-axes, respectively, $t$ represents the time points, and the long term running averages are taken over a number N2 of the time points as $1/N2 \sum_{t=i-N2+1}^{t=i} Ax(t)$, $1/N2 \sum_{t=i-N2+1}^{t=i} Ay(t)$ and $1/N2 \sum_{t=i-N2+1}^{t=i} Az(t)$, for the x-, y- and z-axes, respectively, and $1.3 \times N1 < N2 < 1.7 \times N1$, and (b) temporarily suspend the tracking of the movement of the user in response to an indication that the movement of the 3-D depth camera is detected.

14. The motion capture system of claim 13, wherein:
the short and long term running averages and the differences between the short and long term running averages, are obtained for each of the x-, y- and z-axes.

15. The motion capture system of claim 13, wherein:
the one or more processors modify the signal to the display in response to the indication that movement of the 3-D depth camera is detected.

16. The motion capture system of claim 13, wherein:
the 3-D depth camera includes multiple three-axis accelerometers; and
the short and long term running averages are obtained from readings from the multiple three-axis accelerometers, by averaging across readings from the multiple three-axis accelerometers.

* * * * *